(12) United States Patent
Larsen

(10) Patent No.: US 10,726,115 B2
(45) Date of Patent: Jul. 28, 2020

(54) BIOMETRIC DEVICE

(71) Applicant: ZWIPE AS, Oslo (NO)

(72) Inventor: Steffen Larsen, Oslo (NO)

(73) Assignee: Zwipe AS, Oslo (NO)

( * ) Notice: Subject to any disclaimer, the term of this patent is extended or adjusted under 35 U.S.C. 154(b) by 143 days.

(21) Appl. No.: 16/062,196

(22) PCT Filed: Dec. 23, 2016

(86) PCT No.: PCT/EP2016/082566
§ 371 (c)(1),
(2) Date: Jun. 14, 2018

(87) PCT Pub. No.: WO2017/109176
PCT Pub. Date: Jun. 29, 2017

(65) Prior Publication Data
US 2018/0373857 A1    Dec. 27, 2018

(30) Foreign Application Priority Data

Dec. 24, 2015    (GB) .................................. 1522870.3

(51) Int. Cl.
*G06F 21/00*    (2013.01)
*G06F 21/32*    (2013.01)
(Continued)

(52) U.S. Cl.
CPC .............. *G06F 21/32* (2013.01); *G06F 21/45* (2013.01); *G06K 9/00006* (2013.01);
(Continued)

(58) Field of Classification Search
CPC .. G06F 21/32; G06F 21/45; G06F 2221/2113; G06Q 20/341; G06K 19/0718; G06K 9/00006
See application file for complete search history.

(56) References Cited

U.S. PATENT DOCUMENTS

2004/0148526 A1    7/2004  Sands et al.
2005/0001711 A1*   1/2005  Doughty .............. G06Q 20/327
                                                340/5.74
(Continued)

FOREIGN PATENT DOCUMENTS

JP    2001067523 A    3/2001
KR    1020150096366 A    8/2015
(Continued)

OTHER PUBLICATIONS

International Search Report and Written Opinion, PCT/EP2016/082566, dated Mar. 6, 2017 (11 pp.).
Search Report for GB1522870.3, dated May 23, 2016 (4 pp.).

*Primary Examiner* — Brandon S Hoffman
*Assistant Examiner* — William A Corum, Jr.
(74) *Attorney, Agent, or Firm* — Eversheds Sutherland (US) LLP

(57) ABSTRACT

A method of using a smartcard may include detecting possible fraudulent use of a biometric sensor embedded within the smartcard and restricting, but not preventing, subsequent use of the smartcard after the possible fraudulent use has stopped. The restriction may include one or more of not permitting the bearer to make an action that they would normally be permitted to make, requiring a higher authorization confidence score than would normally be required before permitting the bearer to perform one or more actions, and requiring the bearer to pass a secondary authorization step before permitting the bearer to perform one or more actions.

15 Claims, 4 Drawing Sheets

(51) Int. Cl.
*G06F 21/45* (2013.01)
*G06K 9/00* (2006.01)
*G06K 19/07* (2006.01)
*G06Q 20/34* (2012.01)

(52) U.S. Cl.
CPC ....... *G06K 19/0718* (2013.01); *G06Q 20/341* (2013.01); *G06F 2221/2113* (2013.01)

(56) References Cited

U.S. PATENT DOCUMENTS

| | | |
|---|---|---|
| 2006/0000892 A1 | 1/2006 | Bonalle et al. |
| 2008/0067247 A1 | 3/2008 | McGregor et al. |
| 2009/0145972 A1* | 6/2009 | Evans ................. G06Q 20/341 235/492 |
| 2010/0071031 A1* | 3/2010 | Carter .................... G06F 21/32 726/2 |
| 2011/0302660 A1* | 12/2011 | Mahalingaiah ......... G06F 21/31 726/28 |
| 2013/0207786 A1 | 8/2013 | Hutzler et al. |
| 2015/0074615 A1* | 3/2015 | Han ................. G06K 9/00033 715/863 |
| 2015/0206148 A1* | 7/2015 | Cherry ............... G06K 19/0718 705/67 |

FOREIGN PATENT DOCUMENTS

| | | |
|---|---|---|
| WO | 2003023979 A2 | 3/2003 |
| WO | 2004105157 A2 | 12/2004 |
| WO | 2007019104 A2 | 2/2007 |
| WO | 2008060922 A2 | 5/2008 |
| WO | 2010034036 A1 | 3/2010 |
| WO | 2014015386 A1 | 1/2014 |

\* cited by examiner

BIOMETRIC DEVICE

TECHNICAL FIELD

The present invention relates to a smartcard including an embedded biometric sensor, and to a method of using such a card to authenticate its bearer.

BACKGROUND OF THE INVENTION

The increasing use of electronic cards, such as credit or debit cards, to make payments and cash withdrawals brings with it also an increased risk of fraud. For example, where the user's card is stolen, an unauthorised person may be able to make unauthorised electronic payments or cash withdrawals from the user's bank account or credit provider.

The use of chip-and-PIN protection has decreased the risk of this type of fraud through the use of two-factor authentication, i.e. the possession of the physical card as well as the knowledge of the user's PIN. However, this type of authentication can be inconvenient at times. Furthermore, contactless payment technology is becoming increasing prevalent and often does not require entry of a PIN, meaning that an unauthorised user may still be able to make fraudulent transactions using a stolen card via contactless payment.

One solution that has been proposed is the use of a smartcard that includes a biometric sensor, such as a fingerprint sensor, which is embedded into the card. The authorised user initially enrolls their fingerprint onto the actual card, and is then required to place their finger or thumb on the fingerprint sensor in order to authorise any payment or withdrawal. If the fingerprint matching algorithm in the card detects a match then the card allows the smartcard secure element to communicate with the POS or ATM terminal and allow a financial transaction to take place. If there is no match then there is no transaction.

SUMMARY OF THE INVENTION

There is a desire to improve the utility of such biometric smartcards without compromising the improvement to security that they bring.

Thus, in a first aspect, the present invention provides a method comprising: authenticating the identity of a bearer of a portable biometric authentication device using a biometric sensor embedded within the device and determining a confidence core of the authentication; permitting a first action if the bearer is authenticated and the confidence score is below a predetermined threshold; and permitting a second action if the bearer is authenticated and the confidence score is above the predetermined threshold.

This method allows for use of the device even when the fingerprint, thumbprint, or other biometric scan is not a perfect match. This can occur, for example in the case of a fingerprint, when the bearer cuts or burns their finger, leading to damage that changes in the fingerprint compared to the fingerprint previously recorded on the device.

As used herein, the term "portable" should be understood to distinguish from fixed scanners, for example those mounted to a wall or larger device. In various embodiments, the portable device may have a mass of less than 100 grams and/or a volume of less than 100 cubic centimetres. The device may be in the form of a card, a fob, or the like.

It will be appreciated that most biometric verification algorithms do not simply provide a yes/no output when authenticating a biometric scan, but will also provide a "confidence score" of some form, though not always known by this name, that indicates the degree of confidence in accuracy of the match.

Typically a confidence score will indicate the confidence of a match only after authentication, i.e. there may not be a confidence score if the print is not a deemed to be match. Often a confidence score will range from 0 or 0%, for barely a match, to 1 or 100% for a perfect match (or vice versa). However, depending on the algorithm, the confidence score may itself be used for determining the match, e.g. above a threshold confidence score, a match is determined.

Preferably, a second set of actions is permitted if the bearer is authenticated and the confidence score is above the threshold. The second set of actions preferably includes the first action and at least one action not permitted if the bearer is authenticated and the confidence score is below the predetermined threshold.

In some embodiments, a first set of actions may be permitted if the bearer is authenticated and the confidence score is below the threshold. The second set of actions preferably includes one or more actions not in the first set of actions, and preferably includes all of the first set of actions.

The first action or set of actions preferably results in less harm than the second action or set of actions, were it or they to be carried out fraudulently. That is to say, lower-security actions may be permitted to a bearer in the event of damage or the like to their body affecting biometric scans, so that the user's device is not entirely disabled, whilst restricting access to higher-security functions in order to minimise possible fraudulent use of the device by an unauthorised person having a similar biometric scan.

In some embodiments, one or more of the actions may be transactions. For example, one or more of the actions may be a financial transaction, such including a payment, a cash withdrawal, such as from an automatic teller machine or the like, a bank transfer, or any other financial transaction.

In one embodiment, the first action may be a non-financial action, such as viewing a balance of an account or requesting re-issue of the card, and the second action may be a financial action, such as a payment, a cash withdrawal, or a bank transfer. As above, this reduces the risk that fraudulent financial transactions are carried out, whilst still permitting some use of the device.

In one embodiment, the first and second actions may be financial actions. The first financial transaction may be a financial transaction that does not exceed a predetermined first financial cap. The second financial transaction may then be a financial transaction that either does not exceed a predetermined second, higher financial cap or is not subject to a financial cap.

The first financial transaction may include a first set of financial actions and the second financial transaction may include a second set of financial actions including financial actions not in the first set of financial actions.

In an alternative embodiment, the actions may include accessing one or more secure areas. In the present context, secure area refers to an area not readily accessible by the general public, such as an area that requires an access card or other authorisation to access.

Preferably the first action includes accessing one or more low-security secure areas and the second action includes accessing the one or more low-security secure areas and one or more high-security secure areas.

For example, the low-security areas secure might include communal areas within a secure site, such as permitting access to one or more of a parking area, a lobby, a break room and the like, whereas the high-security areas may include areas with more restricted access, e.g. where only a subset of users of the site can access, for example areas with confidential information or storing high value goods or the like.

In some embodiment, the method may comprise sending an alert when the bearer is authenticated and the confidence score is below a predetermined threshold, and optionally when one or more other criteria are met. Such criteria may, for example, include a number of days since a high-level authentication was made, or after a predetermined number of first actions have been made. The alert may be sent to the device issuer and/or the bearer of the device. This may be desirable so that the device issuer is aware that the device is being used in this mode, e.g. to monitor if the use is suspicious. It may also permit the bearer to be informed, if they are not aware, that they are using the device in a degraded mode. This may prompt them to resolve the situation, for example by enrolling a new biometric identifier.

In some embodiment, multiple thresholds may be used, with additional actions being permitted as the confidence score passes higher thresholds.

In preferred embodiments, the biometric sensor is a fingerprint sensor. However, it will be appreciated that other biometric identifiers may be used, such as EKG readings or the like.

The method may comprise detecting repeated, unsuccessful authorisation attempts. This may be detected either by the device itself or by a separate computer system. The unsuccessful authorization attempts may be unsuccessful because the bearer's fingerprint does not match a reference fingerprint stored on the device, although other means of detection may also be employed.

The method may further comprise sending an alert indicating possible fraud responsive to detecting the repeated, unsuccessful authorization attempts. This alert may be sent after a predetermined number of attempts, and/or responsive to certain other criteria being satisfied. For example, fewer attempts may be required before sending an alert where the device is being used to permit a second action than when it is being used to permit a first action.

The method may further comprise restricting the first and/or second actions of the bearer responsive to detection of repeated, unsuccessful authorisation attempts and/or detecting possible fraudulent use. For example, the bearer may not be permitted to make second actions, even if a high confidence score is detected. Alternatively, or additionally, the bearer may not be permitted to take actions with a low confidence score.

In some embodiment, the bearer may be required to meet additional criteria in order to perform the first and/or second actions, such as passing a secondary authorisation step. The secondary authorisation step may include, for example, entering a PIN.

The restriction may remain in place until it is removed by an authorised person or entity. This could be, for example, any person authorised by the bearer or the device issuer.

In some embodiments, the bearer may be authorised to remove the restriction only after passing a secondary authorisation. For example, the bearer may be sent a re-activation code, e.g. by mail, email, text or the like, which may be entered into a terminal (e.g. a bank terminal) to remove the restriction. In an alternative, the bearer may be able to remove the restriction using a password, for example by logging onto a digital control panel (e.g. online banking or a secure computer interface). In yet another embodiment, the bearer may be required to present identification to the device issuer, for example by presenting a photographic identification document to a bank teller, who can then remove the restriction.

Whilst this restricted mode of operation may be combined with the degraded mode of operation due to a low confidence score, it may also be used separately. Viewed from another aspect, the present invention may therefore provide a method comprising: detecting possible fraudulent use of a portable biometric authentication device including a biometric sensor embedded therein; and restricting, but not preventing, subsequent use of the device after the possible fraudulent use has stopped. The method may optionally include any one or more or all of the optional features described in relation to the method above.

In accordance with this method, some of the risk associated with biometric sensors can be negated by restricting later use of the device when a possible fraudulent use is detected, but not entirely disabling the device. Thus, should the system detect possibly fraudulent use, once this possibly fraudulent use stops, then the device will remain active but with reduced functionality. The availability of this degraded mode of operation does not, of course, prevent completely disabling the device in a conventional manner, e.g. if actual fraud is identified, such as when the device is stolen or otherwise compromised.

As above, detecting possible fraudulent use may comprise detecting repeated, unsuccessful authorisation attempts to obtain authorisation using the biometric sensor. This may be detected either by the device itself or by a separate computer system. The unsuccessful authorization attempts may be unsuccessful because the bearer's fingerprint does not match a reference fingerprint stored on the device, although other means of detection may also be employed.

The method may further comprise sending an alert indicating possible fraud responsive to detecting the possible fraud, e.g. by detecting repeated, unsuccessful authorization attempts. This alert may be sent after a predetermined number of attempts, and/or responsive to certain other criteria being satisfied. For example, fewer attempts may be required before sending an alert where the bearer attempts to perform one action than for another action.

In the degraded mode of operation, the bearer is still able to perform at least one action, once authorised. That is to say, in this mode of operation, the device is not completely disabled. The restriction may include that the bearer is permitted to make a first action, but is not permitted to make a second action they would normally be permitted to make. Alternatively, or additionally, authentication may require a higher confidence score for one or more actions than would normally be required.

The restriction may include that the bearer is required to meet additional criteria in order to perform one or more actions, such as passing a secondary authorisation step. The secondary authorisation step may include, for example, entering a PIN.

The restriction may remain in place until it is removed by an authorised person or entity. This could be, for example, by an authorised person of the device issuer. Alternatively, the bearer may be sent a re-activation code, e.g. by mail, email, text or the like, which may be entered into a terminal (e.g. a bank terminal) to remove the restriction. In yet another alternative, the bearer may be able to remove the restriction themself, if they are so authorised, for example using a digital control panel (e.g. online banking or a secure computer interface).

The restriction may include disabling the biometric sensor, or otherwise preventing authorisation of the bearer using the biometric sensor. Thus, the device can only be used by other means, such as signature or chip-and-PIN.

The present invention may also provide a portable biometric authentication device, which may be a smartcard, for use with this method. Thus, a portable biometric authentication device may comprise a biometric sensor embedded therein, wherein the device is configured to detecting possible fraudulent use of the biometric sensor and enter into a restricted mode of operation. The device may implement any aspects of the method described above.

In one embodiment, when the bearer is authenticated and when operating in the restricted mode of operation, the device may transmit a message indicating authentication of the bearer including an indication that the device is operating in a restricted mode of operation.

In other embodiments, when the bearer is authenticated and when operating in the restricted mode of operation, the device may transmit a message that only permits a subset of the actions normally permitted to an authenticated bearer.

Returning to the first method, in various embodiments, the authentication may be performed (locally) on the device, e.g. such that the scanned fingerprint does not leave the device. For example, after authenticating the identity of a bearer, the device may transmit a message indicating the bearer has been authenticated, which may include the confidence score, or may be indicative of the confidence score (e.g. transmitting a first message if the confidence score is below the predetermined threshold and a second, different message if the confidence score is above the predetermined threshold).

In a further aspect, the present invention may also provide a portable biometric authentication device for use with the method above. Thus, a portable biometric authentication device may comprise a biometric sensor embedded therein, wherein the device is configured to authenticate the identity of a bearer of a device using the biometric sensor, determine a confidence score of the authentication, and transmit a message indicating whether the bearer has been authenticated, wherein the message is indicative of a confidence score of the authentication.

The device is preferably capable of wireless communication, such as using RFID or NFC communication. However, the device may comprise a contact connection, for example via a contact pad or the like. In various embodiments, the device may permit both wireless communication and contact communication.

Exemplary devices may include one of an access card, a credit card, a debit card, a pre-pay card, a loyalty card, an identity card, and a cryptographic card.

The device may be a smartcard, which preferably has a width of between 85.47 mm and 85.72 mm, and a height of between 53.92 mm and 54.03 mm. The smartcard may have a thickness less than 0.84 mm, and preferably of about 0.76 mm (e.g. ±0.08 mm), which are the thickness of a normal smartcard. More generally, the smartcard may comply with ISO 7816, which is the specification for a smartcard.

It will be appreciated that the method described above may use a device employing any one or more of all of the optional features of this portable biometric authentication device.

In yet a further aspect, the present invention may also provide a computer system comprising a device reader for communicating with a portable biometric authentication device having an embedded biometric sensor, wherein the computer system is configured to receive an indication of a confidence score of an authentication of the bearer of the device, and wherein the computer system is configured to permit a first action if the bearer is authenticated and the confidence score is below a predetermined threshold and to permit a second action if the bearer is authenticated and the confidence score is above the predetermined threshold.

The computer system may be configured to carry out any one or more or all of the optional and preferred features described above.

BRIEF DESCRIPTION OF THE DRAWINGS

Certain preferred embodiments on the present invention will now be described in greater detail, by way of example only and with reference to the accompanying drawings, in which.

DETAILED DESCRIPTION OF THE INVENTION

Figure 1:
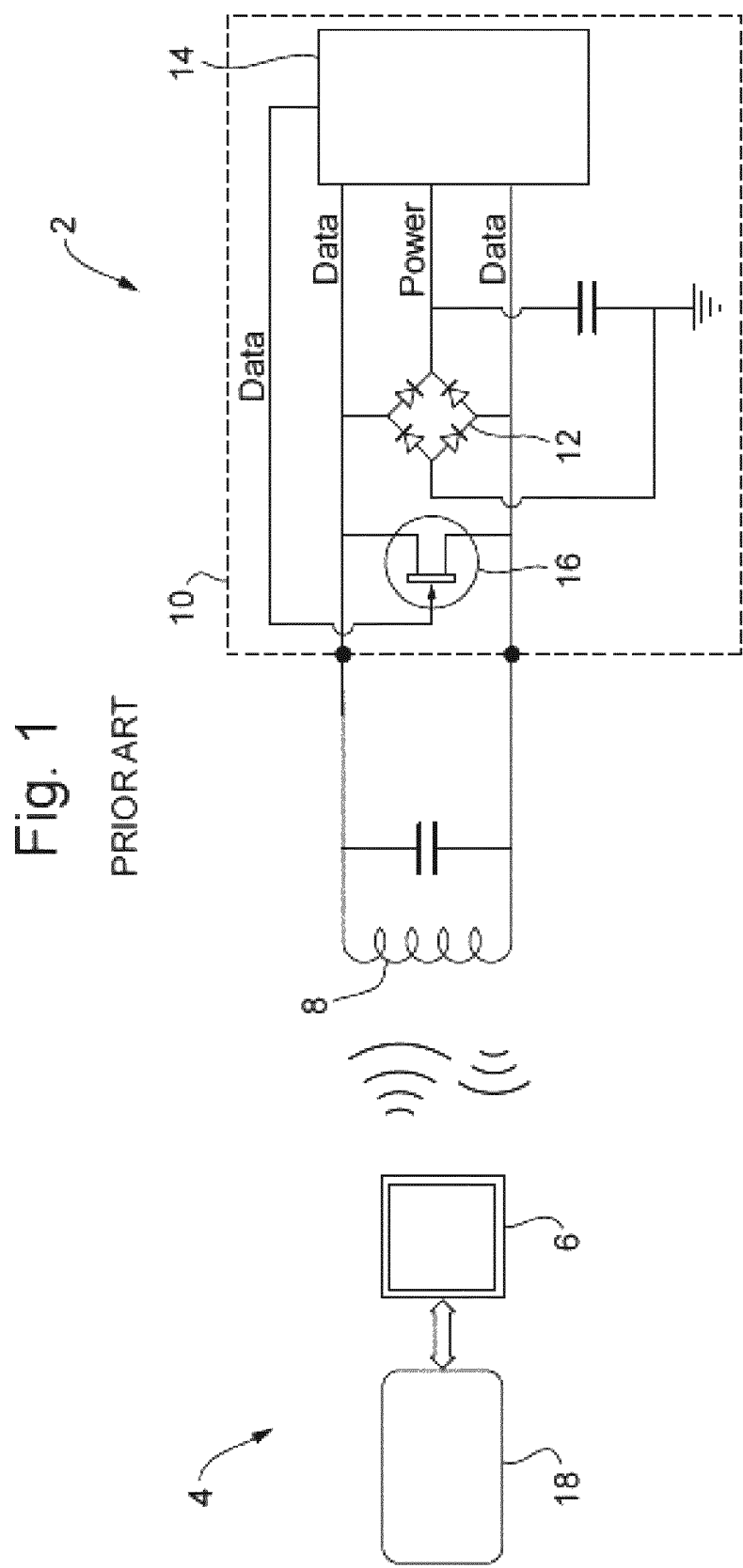
FIG. 1 illustrates a circuit for a prior art passive smartcard.

FIG. 1 shows the architecture of a typical passive smartcard 2. A powered card reader 4 transmits a signal via an antenna 6. The signal is typically 13.56 MHz for MIFARE® and DESFire® systems, manufactured by NXP Semiconductors, but may be 125 kHz for lower frequency PROX® products, manufactured by HID Global Corp. This signal is received by an antenna 8 of the smartcard 2, comprising a tuned coil and capacitor, and then passed to a communication chip 10. The received signal is rectified by a bridge rectifier 12, and the DC output of the rectifier 12 is provided to processing unit 14 that controls the messaging from the communication chip 10.

A control signal output from the processing unit 14 controls a field effect transistor 16 that is connected across the antenna 8. By switching on and off the transistor 16, a signal can be transmitted by the smartcard 2 and decoded by suitable control circuits 18 in the reader 4. This type of signalling is known as backscatter modulation and is characterised by the fact that the reader 4 is used to power the return message to itself.

Figure 2:
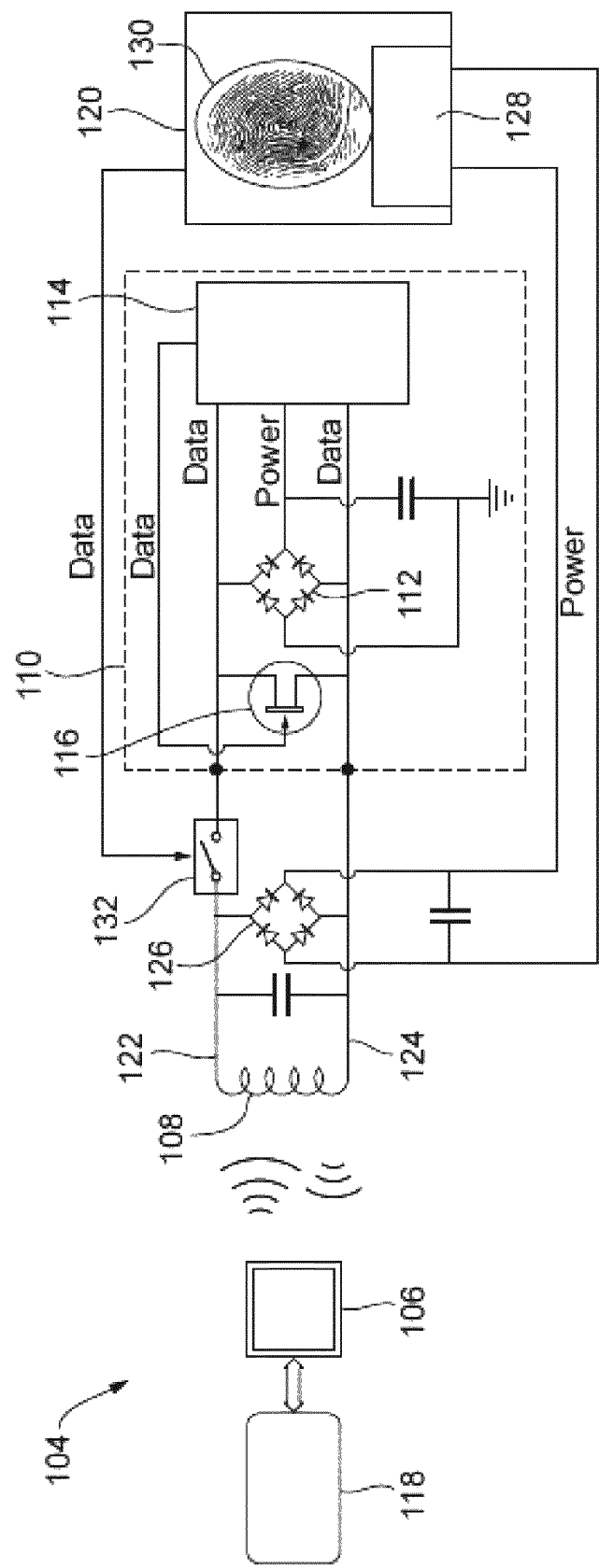
FIG. 2 illustrates a circuit for a passive smartcard incorporating a fingerprint scanner.

FIG. 2 shows the architecture of a card reader 104 and a passive smartcard 102, which is a variation of the prior art passive smartcard 2 shown in FIG. 1. The smartcard 102 shown in FIG. 2 has been adapted to include a fingerprint authentication engine 120.

The smartcard 102 again comprises an antenna 108 for receiving an RF (radio-frequency) signal, a passive communication chip 110 powered by the antenna 108, and a passive fingerprint authentication engine 120, also powered by the antenna 108.

As used herein, the term "passive smartcard" should be understood to mean a smartcard 102 in which the communication chip 110 is powered only by energy harvested from an excitation field, for example generated by the card reader 118. That is to say, a passive smartcard 102 relies on the reader 118 to supply its power for broadcasting. A passive smartcard 102 would not normally include a battery, although a battery may be included to power auxiliary components of the circuit (but not to broadcast); such devices are often referred to as "semi-passive devices".

Similarly, the term "passive fingerprint/biometric authentication engine" should be understood to mean a fingerprint/ biometric authentication engine that is powered only by energy harvested from an excitation field, for example the RF excitation field generated by the card reader 118.

The antenna 108 comprises a tuned circuit including an induction coil and a capacitor, which are tuned to receive an RF signal from the card reader 104. When exposed to the excitation field generated by the reader 104, a voltage is induced across the antenna 108.

The antenna 108 has first and second end output lines 122, 124, one at each end of the antenna 108. The output lines of the antenna 108 are connected to the fingerprint authentication engine 120 to provide power to the fingerprint authentication engine 120. In this arrangement, a rectifier 126 is provided to rectify the AC voltage received by the antenna 108. The rectified DC voltage is smoothed using a smoothing capacitor and supplied to the fingerprint authentication engine 120.

Figure 3:
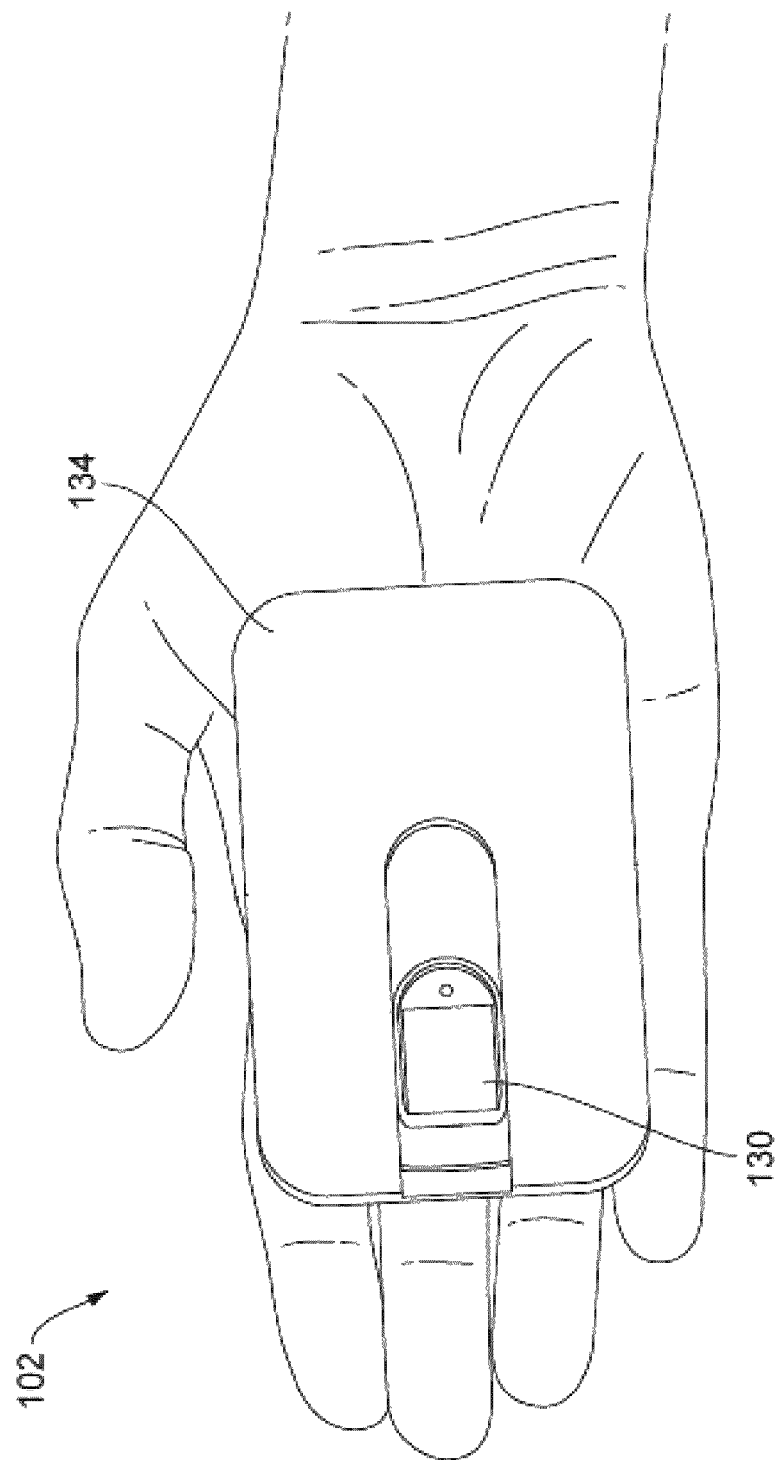
FIG. 3 illustrates an external housing for the passive smartcard incorporating the fingerprint scanner.
Figure 4:
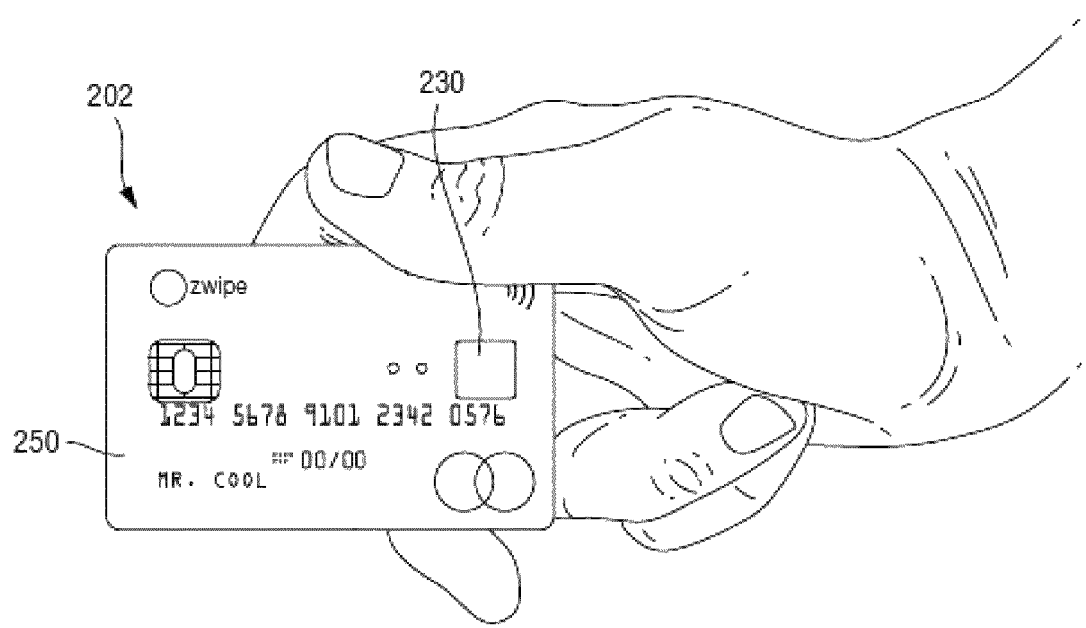
FIG. 4 illustrates a laminated passive smartcard incorporating the fingerprint scanner.

The fingerprint authentication engine 120 includes a processing unit 128 and a fingerprint reader 130, which is preferably an area fingerprint reader 130 as shown in FIGS. 3 and 4. The fingerprint authentication engine 120 is passive, and hence is powered only by the voltage output from the antenna 108. The processing unit 128 comprises a microprocessor that is chosen to be of very low power and very high speed, so as to be able to perform biometric matching in a reasonable time.

The fingerprint authentication engine 120 is arranged to scan a finger or thumb presented to the fingerprint reader 130 and to compare the scanned fingerprint of the finger or thumb to pre-stored fingerprint data using the processing unit 128. A determination is then made as to whether the scanned fingerprint matches the pre-stored fingerprint data. In a preferred embodiment, the time required for capturing a fingerprint image and authenticating the bearer of the card 102 is less than one second.

If a match is determined, then the communication chip 110 is authorised to transmit a signal to the card reader 104 via a communication line connecting the fingerprint authentication engine 120 to the processing unit 114 of the communication chip 110. The communication chip 110 transmits the signal by backscatter modulation, in the same manner as the conventional communication chip 10.

In some circumstances, the owner of the card 102 may suffer an injury resulting in damage to the finger that has been enrolled on the card 102. This damage might, for example, be a scar on the part of the finger that is being evaluated. In a conventional system, the threshold for determining a match may be set very high, in order to ensure good security. However, as a result, such damage can mean that the owner will not be authorised by the card 102.

The following method permits a degraded mode of operation of the biometric card 102, which may permit limited use of the card 102 by the bearer in the event of such injury or the like. This means that the user can still carry out basic functions, until such a time as the injury has healed, a new card 102 can be issued or it is possible to enroll a new fingerprint onto the existing card 102, e.g. of a different finger or including the injury/scar.

The fingerprint authentication unit 120 is configured to use a relatively low threshold for determining a match. Then, when carrying out the authentication, the fingerprint authentication unit 120 also determines a confidence score. The transmitted signal contains both an indication that the bearer of the card has been authenticated, as well as the confidence score of the authentication. This permits the card reader 118 (or a computer system to which it is connected) to determine what level of access to grant to the bearer of the card 102.

In one embodiment, the smartcard 102 may be a token or the like having a rigid housing 134, from which the fingerprint sensor 130 is exposed. This arrangement is illustrated in FIG. 3. In another embodiment, the smartcard 202 may be a laminated-type smartcard 202, such as illustrated in FIG. 4. Such smartcard will typically comply with ISO 7816, which is the international specification for a smartcard.

In one embodiment, the smartcard 102 is a financial card, such as a credit, debit or other payment card. The card reader 118 may be a point-of-sale terminal or the terminal of an automatic teller machine. The card reader 118 is configured so as to recognize three levels confidence, and permit corresponding levels of performance.

Level 1)

A level 1 score permits a full functionality mode of operation. This level requires there to be a full match with a very low false rejection rate (FRR), i.e. a very high biometric matching confidence score. This is the level that would typically be required in a conventional system in order to authenticate the bearer of the card. When the match satisfies these criteria, the card operates at full functionality. For example, in the case of a payment or a cash withdrawal, transactions may be authorised using the card up to the maximum card authorization amount, for example, up to a $400 limit.

Level 2)

A level 2 score permits a reduced functionality mode of operation. This level might require either a partial match with a low matching score and/or an intermediate FRR. This level of match would typically be rejected in a conventional system. However, there is still a reasonable likelihood that the bearer is the authorised person. When the match satisfies these criteria, the card will still operate, but with reduced functionality. For example, in the case of a payment or a cash withdrawal, transactions may be authorised using the card up to the reduced authorization amount, for example, up to a $50 limit.

Level 3)

A level 3 score does not permit operation. This level would typically occur when there is a very high FRR. At this level of score, the card will not operate. For example, in the case of a payment or a cash withdrawal, transactions will not be authorised.

It should be noted that most biometric matching algorithms provide a matching or confidence score of some sort. Often, the determination of whether or not to authenticate the bearer is made based on whether or not this score exceeds some threshold. As such, many existing biometric matching algorithms can be used to implement this method.

Should the card 102 detect repeated attempts at authorization with no success, i.e. multiple level 3 scans, then the card may send a signal to the reader 118 indicating possible fraud. For example, the card may send such a message after three failed attempts.

In various embodiments, each time the card detects a level 3 scan, it may send a message to the reader 118 informing it that a non-authenticated bearer has attempted to use the card, and the number of successive attempts made.

The card may be configured so as to then be inoperable, or put into a further reduced mode of operation, after a certain number of failed authorisation attempts. The card may be put into this mode until the card is re-enabled, for example by entering a PIN at a bank terminal or by presenting photographic identification to a human bank teller.

If a reduced mode of operation is enabled, then the card 102 may only be usable with a PIN or other verification means. The card may also or alternatively have a reduced transaction limit imposed, for example $25, even when used with PIN or with a subsequently correctly authorised fingerprint.

Whilst the above embodiments relate primarily to financial smartcards, it will be appreciated that this mode of operation may be applied to any other type of device incorporating a biometric authentication module 120. For example, the method could be applied to an access control system, where a level 1 scan permits access to all areas that the bearer is permitted to access, and a level 2 scan, which still permits degraded mode of operation, might allow access to low security areas, such as into a building or car park so that the bearer can still, for example, get to the security desk to request a replacement card, or the like. In such systems, the smartcard 102 could be replaced, for example, with a fob or the like.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

I claim:

1. A method of operating a smartcard having a biometric sensor embedded therein, the method comprising:
   operating the smartcard in a normal mode of operation;
   detecting possible fraudulent use of the smartcard; and
   responsive to detection of possible fraudulent use of the smartcard, operating the smartcard in a restricted mode of operation in which use of the smartcard is restricted but not prevented,
   wherein the restriction comprises at least one of:
      permitting a bearer of the smartcard to perform a first action after authorisation that they would be permitted perform in the normal mode of operation, and not permitting the bearer to perform a second action after authorisation that they would be permitted to perform in the normal mode of operation;
      requiring a higher authorisation confidence score before permitting the bearer to perform an action than would be required to perform the same action in the normal mode of operation; and
      requiring the bearer to pass a primary authorisation step and a secondary authorisation step, both performed by the smartcard, before permitting the bearer to perform an action, wherein the secondary authorisation step would not be required to perform the same action in the normal mode of operation; and
      preventing authorisation of the bearer using the biometric sensor when authorising the bearer by the smartcard.

2. A method according to claim 1, wherein the possible fraudulent use is detected by the smartcard itself.

3. A method according to claim 1, wherein the detection of possible fraudulent use comprises detecting repeated, unsuccessful attempts to obtain authorisation using the biometric sensor.

4. A method according to claim 3, wherein possible fraudulent use is detected after a first number of repeated, unsuccessful attempts to obtain authorisation to perform a first action, and wherein possible fraudulent use is detected after a second, different number of repeated, unsuccessful attempts to obtain authorisation to perform a second action.

5. A method according to claim 1, further comprising sending an alert indicating possible fraud responsive to detecting the possible fraudulent use.

6. A method according to claim 1, wherein the restriction includes permitting the bearer to perform a first action after authorisation that they would be permitted to perform following authentication in the normal mode of operation, but not permitting the bearer to perform a second action after authorisation that they would be permitted to perform following authentication in the normal mode of operation.

7. A method according to claim 1, wherein the restriction includes requiring a higher authorisation confidence score before permitting the bearer to perform an action than would be required to perform the same action in the normal mode of operation.

8. A method according to claim 1, wherein the restriction includes requiring the bearer to pass a primary authorisation step and a secondary authorisation step, both performed by the smartcard, before permitting the bearer to perform an action, wherein the secondary authorisation step would not be required to perform the same action in the normal mode of operation.

9. A method according to claim 1, wherein the restriction includes preventing authorisation of the bearer using the biometric sensor when authorising the bearer of the smartcard.

10. A method according to claim 1, wherein the restriction remains in place until removed by an authorised person or entity.

11. A method according to claim 10, wherein the bearer is authorised to remove the restriction, after passing a secondary authorisation.

12. A method according to claim 1, wherein the biometric sensor is a fingerprint sensor.

13. A smartcard comprising a biometric sensor embedded therein, wherein the smartcard is configured to detect possible fraudulent use of the biometric sensor and enter into a restricted mode of operation,
   wherein use of the smartcard is restricted in the restricted mode of operation as compared to a normal mode of operation, and
   wherein the restriction comprises at least one of:
      permitting a bearer of the smartcard to perform a first action after authorisation that they would be permitted perform in the normal mode of operation, and not permitting the bearer to perform a second action after authorisation that they would be permitted to perform in the normal mode of operation;
      requiring a higher authorisation confidence score before permitting the bearer to perform an action than would be required to perform the same action in the normal mode of operation; and
      requiring the bearer to pass a secondary authorisation step before permitting the bearer to perform an action, wherein the secondary authorisation step is not required to perform the same action in the normal mode of operation; and
      preventing authorisation of the bearer using the biometric sensor.

14. A smartcard according to claim 13, wherein when the bearer is authenticated and when operating in the restricted mode of operation, the device is configured to transmit a message indicating authentication of the bearer including an indication that the smartcard is operating in a restricted mode of operation.

15. A smartcard according to claim 14, wherein when the bearer is authenticated and when operating in the restricted mode of operation, the device is configured to transmit a message that only permits a subset of the actions normally permitted to an authenticated bearer.

\* \* \* \* \*